United States Patent [19]

Amaya et al.

[11] Patent Number: 4,948,854
[45] Date of Patent: Aug. 14, 1990

[54] TRANSPARENT OPTICAL ARTICLE AND PROCESS FOR PREPARING SAME

[76] Inventors: Naoyuki Amaya; Keizo Anan, Both of 32-16, Higashiarai, Yatabemachi, Tsukuba-gun, Ibaraki-ken; Yoshishige Murata, 2-24-5, Sakuramura Umezono, Niihari-gun Ibaraki-ken; Takao Mogami; Yoshio Sano, both of c/o Seiko Epson Corporation, Suwa Kojo, 3-3-5, Owa, Suwa-shi, Nagano-ken; Haruhiro Ikebe, 32-16, Higashiarai, Yatabemachi, Tsukuba-gun, Ibaraki-ken; Rumiko Seita, 11954-3, Sakaecho, Yuki-shi, Ibaraki-ken, all of Japan

[21] Appl. No.: 418,813

[22] Filed: Oct. 3, 1989

Related U.S. Application Data

[63] Continuation of Ser. No. 27,562, Mar. 18, 1987, abandoned.

[30] Foreign Application Priority Data

| | | |
|---|---|---|
| Mar. 25, 1986 [JP] | Japan | 61-64842 |
| Aug. 12, 1986 [JP] | Japan | 61-187862 |
| Aug. 12, 1986 [JP] | Japan | 61-187863 |

[51] Int. Cl.$^5$ .................. C08F 226/02; C08F 222/26; C08F 222/18
[52] U.S. Cl. .................. 526/261; 350/409; 526/292.4; 526/314; 526/321; 526/325
[58] Field of Search .................. 526/292.4, 321, 314, 526/261, 325

[56] References Cited

U.S. PATENT DOCUMENTS 2,366,495  6/1945  D'Alelio .................. 526/321

*Primary Examiner*—Christopher Henderson
*Attorney, Agent, or Firm*—Majestic, Parsons, Siebert & Hsue

[57] ABSTRACT

A transparent optical article is constituted of an optical resin. The optical resin in obtained by polymerizing a feed monomer containing at least a diester of unsaturated dicarboxylic acid selected from the group consisting of itaconic acid, citraconic acid and mesaconic acid. The ester group forming the diester is

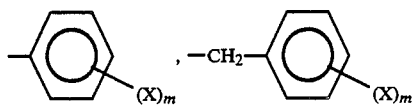

or R, wherein X represents a halogen atom, m represents zero or an integer of 1 to 5 and R represents an alkyl group having 1 to 12 carbon atoms, an alkenyl group having 1 to 12 carbon atoms or a cycloalkyl group having 3 to 12 carbon atoms. At least one of the ester groups has an aromatic ring defined above.

5 Claims, No Drawings

TRANSPARENT OPTICAL ARTICLE AND PROCESS FOR PREPARING SAME

This is a continuation of application Ser. No. 027,562, filed Mar. 18, 1987, now abandoned.

BACKGROUND OF THE INVENTION

1. Field of the Invention

This invention relates to a transparent optical article and a process for preparing the same and more particularly to a transparent optical article constituted of an optical resin and a process for preparing the same.

2. Related Art Statement

Organic polymer materials have hitherto been used as substitutes for inorganic glasses, while taking advantage of their excellent properties that they are transparent and of light weight and they can be handled in safety and easily shaped. Representative examples of organic polymer materials which have been used as organic glasses are polymethyl methacrylate, polydiethyleneglycol bisallyl carbonate, polystyrene and polycarbonate.

These organic polymer materials are used for wide optical applications while taking advantages of the aforementioned merits, although they are inferior to the inorganic glasses in resistance to scratching or abrasion, refractive indices and resistance to heating. However, since the refractive indices of polymethyl methacrylate and polydiethyleneglycol bisallyl carbonate are as low as $n_D = 1.49$ to $1.50$, it is inevitable that an optical article designed to have refractive properties, such as a lens, when made of these materials, becomes considerably thicker than that of the article made of an inorganic glass. As a result, these organic polymer materials to not lend themselves to the recent tendency towards reduction in size and weight of the optical materials.

Although polystyrene and polycarbonate have higher refractive indices of $n_D = 1.59$ to $1.60$, they are inferior in resistance to solvents and double refraction. In addition, they are generally molded by means of melt molding methods, such as injection molding, while they cannot be easily adapted to cast molding useful for multiitem production system.

OBJECTS AND SUMMARY OF THE INVENTION

It is a principal object of the present invention to provide a transparent optical article excellent in colorlessness and transparency and a process for preparing such an optical article.

It is another object of the present invention to provide a transparent optical article having a high refractive index and a process for preparing such an optical article.

It is a further object of the present invention to provide a transparent optical article having a low percent shrinkage and a high heat resistance and that can be adapted to cast molding and a process for preparing such an optical article.

The above and other objects of the present invention will become apparent from the following description of the present invention.

According to the present invention, there is provided a transparent optical article constituted of an optical resin obtained by polymerizing a feed monomer consisting essentially of a diester of itaconic acid and a comonomer, eater groups forming said diameter being the same or different groups, said ester group being selected from the group consisting of

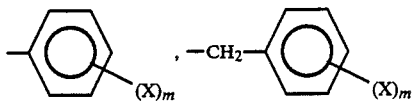

and R, wherein X represents a halogen atom, m represents zero or an integer of 1 to 5 and R represents an alkyl group having 1 to 12 carbon atoms, an alkenyl group having 1 to 12 carbon atoms or a cycloalkyl group having 3 to 12 carbon atoms, at least one of said ester groups being selected from the group consisting of

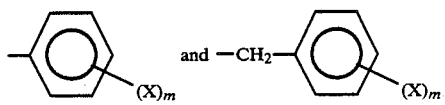

wherein X and m represent the same as above, said comonomer being selected from the group consisting of styrene, p-methyl styrene, p-chlorostyrene, o-chlorostyrene, p-bromostryene, o-bromostyrene, p-di-vinylbenzene, m-divinylbenzene, divinyl biphenyl, vinyl acetate, vinyl propionate, vinyl benzoate, methyl methacrylate, butyl methacrylate, methyl acrylate, ethyl acrylate, phenyl methacrylate, phenyl acrylate, benzyl methacrylate, benzyl acrylate, bromophenyl methacrylate, methacrylonitrile, ethyleneglycol dimethacrylate, diethyleneglycol dimethyacrylate, ethyleneglycol diacrylate, diethyleneglycol diacrylate, polyethyleneglycol diacrylate, dipropyleneglycol dimethacrylate, bisphenol A dimethacrylate, 2,2-bis (4-methacryloyloxyethoxyphenyl) propane, 2,2-bis (4-acryloyloxyethoxyphenyl) propane, allyl methacrylate, allyl acrylate, diallyl phthalate, diallyl tetrachlorophthalate, diallyl isophthalate, diallyl terephthalate, triallyl triellitate, triallyl cyanurate, triallyl isocyanurate, diethyleneglycol bisallyl carbonate, diallyl tetrachlorophthalate, divinyl benzene, ethyleneglycol diacrylate, ethyleneglycol diedethacrylate, polyethyleneglycol diacrylate, polyethyleneglycol dimethacrylate, diallyl phthalate, diallyl isophthalate, ethyleneglycol bisallyl carbonate, triallyl triellitate, triallyl isocyanurate, triallyl cyanurate and mixtures thereof.

DESCRIPTION OF THE INVENTION

The present invention will be hereafter explained in detail.

The transparent optical article of the present invention is constituted of an optical resin obtained by polymerizing a feed monomer comprising at least a diester of unsaturated dicarboxylic acid having five carbon atoms and one carbon-carbon double bond in a molecule.

More in detail, the feed monomer of the present invention comprises a diester of itaconic acid represented by the general formula (1)

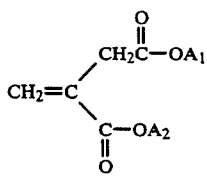

wherein $A_1$, $A_2$ may be the same or different and represent a group selected from the group consisting of

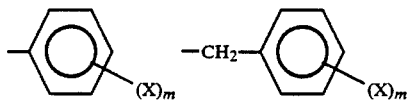

and R, at least one of the groups including an aromatic ring, X represents a halogen atom, m represents 0 or an integer not less than 1 and not more than 5, R represents an alkyl group having 1 to 12 carbon atoms, an alkenyl group having 1 to 12 carbon atoms or a cycloalkyl group having 3 to 12 carbon atoms.

The phenyl group and the benzyl group in the diester of unsaturated dicarboxylic acid may be substituted by one or more halogen atoms ( for m being not less than 1 and not more than 5) or may not be substituted by halogen atoms (for m=0). When the diester group of unsaturated dicarboxylic acid is the alkyl, alkenyl or cycloalkyl group, if the number of carbon atoms in these groups is not less than 13, the optical article prepared from the feed monomer cannot be practically used because it is low in physical properties, such as polymerizability or heat resistance.

Specific examples of the esters of itaconic acid that may be employed in accordance with the present invention include diphenyl itaconate, di(orthochlorophenyl) itaconate, di(orthobromophenyl) itaconate, di(parachlorophenyl) itaconate, di(metabromophenyl) itaconate, di(2', 4'-dichlorophenyl) itaconate, parabromophenyl orthobromophenyl itaconate, benzyl phenyl itaconate, dibenzyl itaconate, di(orthochlorobenzyl) itaconate, di(parachlorobenzyl) itaconate, di(orthobromobenzyl) itaconate, di(metabromobenzyl) itaconate, benzyl orthochlorobenzyl itaconate, benzyl orthobromobenzyl itaconate, di(2', 4'-dichlorobenzyl) itaconate, methyl phenyl itaconate, isopropyl benzyl itaconate, cyclohexyl benzyl itaconate, ethyl benzyl itaconate, isopropyl benzyl itaconate, cyclohexyl phenyl itaconate, allyl benzyl itaconate and methallyl benzyl itaconate. In the above specific examples of the diesters of itaconic acid represented by the general formula (1), the groups $A_1$, $A_2$, if different from each other, are denominated herein in the order of the groups $A_1$- $A_2$.

The optical resin of the present invention is obtained by copolymerizing the aforementioned diesters of unsaturated dicarboxylic acid and one or more comonomers. The comonomers that may be employed in accordance with the present invention may include one or more of radical-polymerizable vinyl monomers, cross-linkable vinyl monomers and cross-linkable allyl monomers.

Examples of these radical-polymerizable vinyl monomers, cross-linkable vinyl monomers and cross-linkable allyl monomers may include styrene, p-methyl styrene, p-chlorostyrene, o-chlorostyrene, p-bromostyrene, o-bromostyrene, p-divinylbenzene, m-divinylbenzene, divinyl biphenyl, vinyl acetate, vinyl propionate, vinyl benzoate, methyl methacrylate, butyl methacrylate, methyl acrylate, ethyl acrylate, phenyl methacrylate, phenyl acrylate, benzyl methacrylate, benzyl acrylate, bromophenyl methacrylate, ethyleneglycol dimethacrylate, diethyleneglycol dimethacrylate, ethleneglycol diacrylate, diethyleneglycol diacrylate, polyethyleneglycol diacrylate, dipropyleneglycol dimethacrylate, bisphenol A dimethacrylate, 2,2-bis(4-methacryloyloxyethoxyphenyl) propane, 2,2-bis(4-acryloyloxyethoxyphenyl) propane, allyl methacrylate, allyl acrylate, diallyl phthalate, diallyl tetrachlorophthalate, diallyl isophthalate, diallyl terephthalate, triallyl trimellitate, triallyl cyanurate, triallyl isocyanurate, diethyleneglycol bisallyl carbonate and diallyl tetrachlorophthalate. For improving the resistance to solvents and heat resistance of the product resin, it is preferred to use at least one of a variety of cross-linkable polyfunctional vinyl monomers and allyl monomers. Specific examples of these cross-linkable vinyl monomers and allyl monomers include divinyl benzene, ethyleneglycol di(metha)acrylate, polyethyleneglycol di(metha)acrylate, diallyl phthalate, diallyl isophthalate, ethyleneglycol bisallyl carbonate, triallyl trimellitate, trialyl isocyanurate and triallyl cyanurate.

The ratio of the comonomer to the diester of unsaturated dicarboxylic acid in the copolymerizable composition ranges preferably from 10000 to 1 weight parts and more preferably 5000 to 10 weight parts of the comonomer to 100 weight parts of the diester of unsaturated carboxylic acid. If the amount of the copolymer exceeds 10000 weight parts, the refractive index of the product resin is markedly lowered. Conversely, with the amount of the comonomer less than 1 weight part, only an insufficient effect may be achieved by the copolymerization with the comonomers.

The polymerization initiators used for polymerizing the monomers or optionally with comonomers in accordance with the present invention may include one or more of organic peroxides and azo compounds each having a decomposition temperature of not more than 120° C. at selected half-life value for 10 hours.

Specific examples of these polymerization initiators include benzoyl peroxide, diisopropyl peroxydicarbonate, tert-butyl peroxy-2-ethyl hexanoate, tert-butyl peroxypivalate, tert-butyl peroxydiisobutylate, lauroyl peroxide, di-n-propyl peroxydicarbonate, di-2-ethylhexyl peroxydicarbonate, tert-butyl peroxyneodecanoate, decanoyl peroxide and azobisisobutyronitrile. The initiator may be used preferably in an amount of not more than 10 weight parts and more preferably in an amount of not more than 5 weight parts based on 100 weight parts of the feed monomer. In preparing the optical resin of the present invention, the feed monomer admixed with the polymerization initiator is directly cast into a suitable die or mold, after which the system is cured at an elevated temperature by polymerization or copolymerization.

It is preferred that the polymerization system be put in an atmosphere of a suitable inert gas, such as nitrogen, carbon dioxide or helium. The feed monomer admixed with a polymerization initiator may also be partially copolymerized at a prescribed temperature of from 30° to 70° C., and then the partially copolymerized mass may be cast into a mold so as to be cured by heating to complete the polymerization.

The heating temperature for curing the feed monomer varies depending on the polymerization initiator, and the feed monomer is polymerized preferably at a temperature of from 30° to 150° C., more preferably at a temperature at which half of the polymerization initiator used for polymerization decomposes for 10 hours. The curing temperature may be raised to shorten the time required for curing or to remove unreacted monomers and polymerization initiators. The time required for complete curing ranges generally from 10 to 48 hours.

The optical resin of the present invention is free from the defects inherent in the conventional optical resin in that it is colorless, transparent and resistant to heat while having a high refractive index $n_D$ of not less than 1.55, Abbe's number of not less than 30 and a low percent shrinkage at the time of casting and polymerization. Thus, the optical resin of the present invention can be used as transparent optical articles such as eyeglass lenses, camera lenses, optical elements or high refractive index resin plates.

EXAMPLES OF THE INVENTION

The present invention will now be described more specifically with reference to examples thereof. It is noted here that the following examples are given by way of example only and the invention is not limited thereby in any sense.

It is noted that the various physical properties of the optical resin have been measured by the following methods.

The refractive index and the Abbe's number were measured by using an Abbe refractometer.

The density was measured in terms of the resin weight/resin volume by using the substitution-in-water method.

The percent polymerization shrinkage of the material was calculated from the equation of $(1 - \rho1/\rho2)$ from the specific gravity of the monomer composition ($\rho M$) and the specific gravity of the cured resin ($\rho P$).

The heat resistance was appraised by allowing the resin to stand for two hours in a desiccator at 130° C., the resin showing no changes such as deformation or coloring after such test being marked ○ as acceptable while those showing such change being marked X as unacceptable.

EXAMPLE 1

A starting monomer mixture composed of 7 g of diphenyl itaconate and 3 g of divinylstyrene was mixed with 0.3 g of benzoyl peroxide. The resulting monomer composition was heated to 60° C. and cast into a die or mold formed of two glass plates using silicone packing. The monomer composition was cured for 24 hours in an oven maintained at a constant temperature of 70° C. under a nitrogen stream and the cured mass was then annealed at 100° C. for 2 hours. The cured and annealed resin was taken out of the mold and the evaluation was carried out by the above described tests on its physical properties.

EXAMPLES 2–6 AND COMPARATIVE EXAMPLES 1 AND 2

Cured resins were prepared from a variety of starting monomers by the procedures similar to those used in Example 1 and by using preselected radical polymerization initiators under preselected curing conditions. The results are shown in the following Table 1.

By way of Comparative Examples, similar tests were conducted on diethyleneglycol bisallyl carbonate and styrene. The results are also shown in Table 1.

TABLE 1

| Example | Monomer | (Part by wt.) | Initiator (wt. %) | Curing Temp. (°C.) | Refractive Index $n_o$ | Abbe's Number | Density | Percent Shrinkage (%) | Heat Resistance |
|---|---|---|---|---|---|---|---|---|---|
| 1 | Diphenyl itaconate | 70 | Benzoyl | 70° C. | 1.597 | 37 | 1.25 | 13 | |
|   | Divinyl styrene | 30 | peroxide (3%) | | | | | | |
| 2 | Dibenzyl itaconate | 60 | Benzoyl | 70° C. | 1.601 | 35 | 1.27 | 14 | |
|   | Styrene | 30 | peroxide (3%) | | | | | | |
|   | 2,2-bis(4-acryloyl-oxyethoxyphenyl-propane | 10 | | | | | | | |
| 3 | Di(orthochloro-benzyl) itaconate | 60 | t-butylperoxy-(2-ethyl- | 70° C. | 1.579 | 38 | 1.24 | 12 | |
|   | Diallyl isophthalate | 40 | hexanoate) (3%) | | | | | | |
| 4 | Isopropyl ortho-chlorobenzyl itaconate | 70 | Diisopropyl peroxydi-carbonate (3%) | 40° C. | 1.598 | 37 | 1.23 | 15 | |
|   | Styrene | 20 | | | | | | | |
|   | 2,2-bis(4-acryloyl-oxyethoxyphenyl)-propane | 10 | | | | | | | |
| 5 | Cyclohexyl benzyl itaconate | 70 | Benzoyl peroxide (3%) | 70° C. | 1.585 | 36 | 1.25 | 14 | |
|   | Divinyl styrene | 30 | | | | | | | |
| 6 | Allyl benzyl itaconate | 50 | Benzoyl peroxide (3%) | 70° C. | 1.574 | 37 | 1.24 | 13 | |
|   | Diallyl isophthalate | 50 | | | | | | | |
| Com. Ex. 1 | Diethyleneglycol-bisallyl carbonate | 100 | Diisopropyl peroxydi-carbonate (3%) | 40° C. | 1.499 | 57 | 1.33 | 13 | |
| Com. Ex. 2 | Styrene | 100 | Benzoyl peroxide (3%) | 70° C. | 1.591 | 35 | 1.05 | 12 | X |

EXAMPLES 7 AND 8

Cured resins were prepared by the procedures similar to those used in Examples 1 to 6 under the conditions shown in Table 2. The results are shown in Table 2.

TABLE 2

| Example | Monomer | (Part by wt.) | Initiator (wt. %) | Curing Temp. (°C.) | Refractive Index $n_D$ | Abbe's Number | Density | Percent Shrinkage (%) | Heat Resistance |
|---|---|---|---|---|---|---|---|---|---|
| 7 | Dibenzyl itaconate | 20 | Diisopropyl peroxydi-carbonate (3%) | 40° C. | 1.568 | 37 | 1.26 | 12 | |
| | Diallyl terephthalate | 70 | | | | | | | |
| | Diethyleneglycol bisallyl carbonate | 10 | | | | | | | |
| 8 | Diorthochloro-benzyl itaconate | 30 | Di-n-propyl peroxydi-carbonate (3%) | 40° C. | 1.572 | 36 | 1.29 | 12 | |
| | Diallyl isophthalate | 60 | | | | | | | |
| | Diethyleneglycol bisallyl carbonate | 10 | | | | | | | |

Although the present invention has been described with reference to the specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. A transparent optical article constituted of an optical resin obtained by polymerizing a feed monomer consisting essentially of a diameter of itaconic acid and a comonomer, ester groups forming said diester being the same or different groups, said ester group being selected from the group consisting of

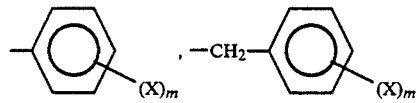

and R, wherein X represents a halogen atom, m represents zero or an integer of 1 to 5 and R represents an alkyl group having 1 to 12 carbon atoms, an alkenyl group having 1 to 12 carbon atoms or a cycloalkyl group having 3 to 12 carbon atoms, at least one of said ester groups being selected from the group consisting of

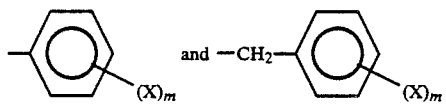

wherein X and m represent the same as above, said comonomer being selected from the group consisting of styrene, p-methyl styrene, p-chlorostyrene, o-chlorostyrene, p-bromostyrene, o-bromostyrene, p-di-vinyl-benzene, m-divinylbenzene, divinyl biphenyl, vinyl acetate, vinyl propionate, vinyl benzoate, methyl methacrylate, butyl methacrylate, methyl acrylate, ethyl acrylate, phenyl methacrylate, phenyl acetate, benzyl methacrylate, benzyl acrylate, bromophenyl methacrylate, methacrylonitrile, ethyleneglycol dimethacrylate, diethyleneglycol dimethyacrylate, ethyleneglycol diacrylate, diethyleneglycol diacrylate, polyethyleneglycol diacrylate, dipropyleneglycol dimethacrylate, bisphenol. A dimethacrylate, 2,2-bis (4-methacryloyloxye-thoxyphenyl) propane, 2,2-bis (4-arcyloyloxyethoxyphenyl) propane, allyl methacrylate, allyl acrylate, diallyl phthalate, diallyl tetrachlorophthalate, diallyl isophthalate, diallyl terephthalate, triallyl trimellitate, triallyl cuanurate, triallyl isocyanurate, diethyleneglycol bisallyl carbonate, diallyl tetrachlorophthalate, divinyl benzene, ethyleneglycol diacrylate, ethyleneglycol dimethacrylate, polyethyleneglycol diacrylate, polyethyleneglycol dimethcrylate, diallyl phthalate, diallyl isophthalate, ethyleneglycol bisallyl carbonate, tirallyl trimelltate, triallyl isocyanurate, triallyl cyanurateand mixtures thereof.

2. A transparent optical article according to claim 1 wherein said diester of itaconic acid is selected from the group consisting of diphenyl itaconate, di(orthochlorophenyl) itaconate, di(orthobromophenyl) itaconate, di(parachlorophenyl) itaconate, di(metabromophenyl) itaconate, di(2', 4'-dichlorophenyl) itaconate, parabromophenyl orthobromophenyl itaconate, benzyl phenyl itaconate, dibenzyl itaconate, di(orthochlorobenzyl) itaconate, di(parachlorobenzyl) itaconate, di(orthobromobenzyl) itaconate, di(metabromobenzyl) itaconate, benzyl orthochlorobenzyl itaconate, benzyl orthobromobenzyl itaconate, di(2', 4'-dichlorobenzyl) itaconate, methyl phenyl itaconate, isopropyl benzyl itaconate, cyclohexyl benzyl itaconate, othyl benzyl itaconate, isopropyl benzyl itaconate, cyclohexyl phenyl itaconate, allyl benzyl itaconate, methallyl benzyl itaconate and mixtures thereof.

3. A transparent optical article according to claim 1 wherein said feed monomer includes 100 weight parts of the diester of itaconic acid and 10000 to 1 weight parts of the comonomer.

4. A transparent optical article constituted of an optical resin obtained by polymerizing a feed monomer including dibenzyl itaconate and a comonomer, the comonomer including diallyl isophthalate.

5. The transparent optical article as in claim 4 wherein the dibenzyl itaconate is about 100 weight parts of the feed monomer and the diallyl isophthalate is about 1 to about 10,000 weight parts of the feed monomer.

* * * * *

UNITED STATES PATENT AND TRADEMARK OFFICE
CERTIFICATE OF CORRECTION

PATENT NO. : 4,948,854  
DATED : AUGUST 14, 1990  
INVENTOR(S) : NAOYUKI AMAYA et al

Page 1 of 2

It is certified that error appears in the above-identified patent and that said Letters Patent is hereby corrected as shown below:

Column 7, line 28, in Claim 1: replace "diameter" with --diester--

Column 7, line 59, in Claim 1: replace "acetate" with --acrylate--

Column 8, line 18-19, in Claim 1: delete the "." after the word bisphenol

Column 8, line 24, in Claim 1: replace "cuanurate" with --cyanurate--

Column 8, line 29, in Claim 1: replace "tirallyl" with --triallyl--

Column 8, line 30, in Claim 1: replace "trimelltate" with --trimellitate--

Column 8, line 30, in Claim 1: replace "cyanurateand" with --cyanurate and--

UNITED STATES PATENT AND TRADEMARK OFFICE
CERTIFICATE OF CORRECTION

PATENT NO. : 4,948,854

DATED : August 14, 1990

INVENTOR(S) : Naoyuki Amaya, et al

It is certified that error appears in the above-identified patent and that said Letters Patent is hereby corrected as shown below:

Column 8, line 45, in Claim 2: replace "othyl" with --ethyl--

Signed and Sealed this

Twenty-seventh Day of August, 1991

Attest:

HARRY F. MANBECK, JR.

Attesting Officer

Commissioner of Patents and Trademarks